United States Patent [19]

Penny et al.

[11] Patent Number: 4,565,639
[45] Date of Patent: Jan. 21, 1986

[54] METHOD OF INCREASING HYDROCARBON PRODUCTION BY REMEDIAL WELL TREATMENT

[75] Inventors: Glenn S. Penny; James E. Briscoe, both of Duncan, Okla.

[73] Assignee: Halliburton Company, Duncan, Okla.

[21] Appl. No.: 699,227

[22] Filed: Feb. 7, 1985

Related U.S. Application Data

[63] Continuation of Ser. No. 456,473, Jan. 7, 1983, abandoned.

[51] Int. Cl.[4] .......................... C09K 7/00; E21B 43/25
[52] U.S. Cl. ........................... 252/8.55 B; 252/8.55 R; 252/8.55 D; 166/305.1
[58] Field of Search ...................... 252/8.55 R, 8.55 D, 252/8.55 B; 166/305 R

[56] References Cited

U.S. PATENT DOCUMENTS

| | | | |
|---|---|---|---|
| 2,765,851 | 10/1956 | Bond | 166/305 R |
| 2,792,400 | 5/1957 | De Groote et al. | 260/295 |
| 3,098,038 | 7/1963 | Thompson et al. | 252/8.55 |
| 4,018,689 | 4/1977 | Thompson | 252/8.55 C |
| 4,028,257 | 6/1977 | Thompson | 252/8.55 C |
| 4,408,043 | 10/1983 | Seale et al. | 544/87 |
| 4,425,242 | 1/1984 | Penny et al. | 252/8.55 R |
| 4,440,653 | 4/1984 | Briscoe | 252/8.55 R |

OTHER PUBLICATIONS

Fluorad Brand Fluorochemical Specialties Introductory Technical Information Bulletin for Additive FC-760, 3M Company, Commercial Chemicals Div., 8/77.
Fluorad Brand Fluorochemical Specialties Introductory Technical Information Bulletin for Additive FC-750, 3M Company, Commercial Chemicals Division, 8/77.
Fluorad Brand Fluorochemical Specialties Introductory Technical Information Bulletin for Additive FC-740, 3M Company, Commercial Chemicals Division, 6/79.
SPE Paper No. 7894, "The Use of Fluorochemical Surfactants in Non-Aqueous Stimulation Fluids", by H. B. Clark, Jul. 1979.

*Primary Examiner*—Teddy S. Gron
*Assistant Examiner*—Virginia B. Caress
*Attorney, Agent, or Firm*—Robert A. Kent; Thomas R. Weaver

[57] ABSTRACT

Methods of increasing hydrocarbon production from subterranean hydrocarbon-containing formations having impaired permeability are provided wherein the formations are contacted with a penetrating solvent and cationic perfluoro compounds represented by the following formula:

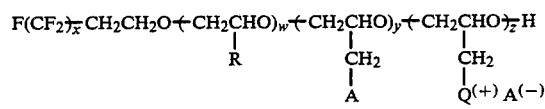

Such perfluoro compounds are adsorbed onto surfaces of the formation and prevent or substantially reduce wetting of the surfaces.

13 Claims, No Drawings

METHOD OF INCREASING HYDROCARBON PRODUCTION BY REMEDIAL WELL TREATMENT

This application is a continuation of application Ser. No. 456,473, filed 01/07/83, now abandoned.

BACKGROUND OF THE INVENTION

1. Field of the Invention

The present invention relates to a method of increasing hydrocarbon production from a subterranean formation having impaired permeability as the result of well drilling or prior stimulation treatments.

2. Description of the Prior Art

Various procedures have been developed and utilized heretofore to increase the flow of hydrocarbons from hydrocarbon-containing subterranean formations penetrated by well bores. For example, a commonly used production stimulation technique involves creating and extending fractures in the subterranean formation to provide flow channels therein through which hydrocarbons flow from the formation to the well bore. The fractures are created by introducing a fracturing fluid into the formation at a flow rate which exerts a sufficient pressure on the formation to create and extend fractures therein. Solid fracture proppant materials, such as sand, are commonly suspended in the fracturing fluid so that upon introducing the fracturing fluid into the formation and creating and extending fractures therein, the proppant material is carried into the fractures and deposited therein whereby the fractures are prevented from closing due to subterranean forces when the introduction of the fracturing fluid has ceased.

In such formation fracturing and other production stimulation procedures, at least a portion of the stimulation fluid or fracturing fluid will leak off into the formation and will reduce the relative permeability of the invaded region of the formation. After fluid injection has ceased, imbibition will begin to alter the fluid distribution within the formation, and when production begins, the fluid will move from the formation into the fracture. It is important to leave the formation after treatment with the maximum permeability or conductivity possible whereby hydrocarbons contained in the formation will flow to the well bore with the least possible restriction. However, substantially all stimulation fluids or fracturing fluids, no matter how carefully they are selected, will do some damage to the formation adjacent to the fracture. In order to achieve maximum conductivity of hydrocarbons from subterranean formations, whether or not such formations have been fractured or otherwise stimulated, it has heretofore been the practice to cause the formation surfaces to remain water wet after treatment. Such water wetting has been shown to provide an improved flow of hydrocarbons through flow channels and capillaries in the magnitude of about three times greater than when the formation surfaces are hydrocarbon wet.

The water wetting of solid surfaces in subterranean hydrocarbon-containing formations as well as the surfaces of solid proppant material deposited therein has heretofore been accomplished using surfactants in the stimulation fluids or fracturing fluids whereby a layer of water or water and surfactant is spread over the solid surfaces. Such layers of water or water and surfactant are extremely viscous near the interface of the layer and the solid surface, and while the layer provides a slippage or lubricating effect at the interface thereof with hydrocarbons which decreases the resistance to flow, the layer reduces the effective diameter of capillaries and flow channels. This reduction of effective diameter restricts fluid flow, and in very small capillaries or flow channels becomes highly significant.

If the formation relative permeability has been damaged by the invasion of the stimulation fluid or fracturing fluid into the formation and this damage results in an increase in the capillary pressure in the damaged region, the capillary pressure in the damaged region then acts as a pressure sink drawing additional water to the damaged region. Unless the pressure drawdown upon attempting production is large enough to overcome the increased capillary pressure, a complete blocking of the formation in the damaged region will occur. Even when the pressure drawdown is sufficient to overcome the capillary pressure, production can be reduced because of the decrease in the capillary radius of the flow channels caused by the layer of water coating the solid surfaces in the formation.

SUMMARY OF THE INVENTION

By the present invention, methods are provided whereby certain fluids are employed to strip water or other aqueous fluids from the formation solids and certain compounds then are caused to be adsorbed onto the solid surfaces in the subterranean hydrocarbon-containing formations in a very thin layer, i.e., a layer which is preferably one molecule thick and significantly thinner than a layer of water or a water-surfactant mixture. The compounds so adsorbed on the surfaces resist or substantially reduce the wetting of the surfaces by water and hydrocarbons and provide high interfacial tensions between the surfaces and water and hydrocarbons which allows slippage of hydrocarbons at the hydrocarbon-surface interface and significantly increases the flow of hydrocarbons through capillaries or flow channels in the formations.

DESCRIPTION OF THE PREFERRED EMBODIMENT

The present invention provides methods for increasing the production of hydrocarbon from a hydrocarbon-containing subterranean formation having impaired permeability as a result of formation invasion by aqueous fluids. The fluid invasion generally results in a coating of the solid surfaces of the formation with the aqueous fluid which results in a decrease in the open cross-sectional area of the capillaries or flow channels in the formation.

The fluids which are utilized in accordance with the methods of this invention to strip the water or aqueous fluid coating from the solid surfaces within the subterranean formation comprise a penetrating solvent. The penetrating solvent can comprise a lower alcohol such as methanol, ethanol, propanol or any other alcohol containing from about 1 to about 5 carbon atoms. The penetrating solvent also can be comprised of acetone or any other fluid which is capable of disrupting the water layer which coats the solid surfaces in the formation.

The compounds which are utilized in accordance with the methods of this invention to prevent solid surfaces from becoming water or hydrocarbon wet while not creating either or both significantly thick or viscous layers thereon are certain cationic perfluoro compounds and mixtures of such compounds represented by the formula:

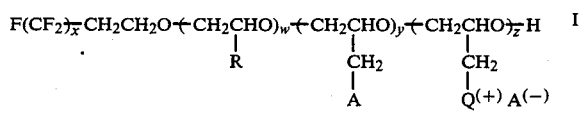   I wherein x is an integer from 2 to 12 or an integer or fractional integer representing an average value of from 2 to 12; w and y are both individually integers from 0 to 20 or are integers or fractional integers representing average values of from 0 to 20; z is an integer of from 0 to 20 or an integer or fractional integer representing an average value of from 0 to 20; the sum of y and z being from 1 to 20; R is a hydrogen, methyl, ethyl or propyl radical, or mixtures thereof; A is a halogen chosen from the group consisting of chlorine, bromine or iodine and may be present as either a halo radical bonded to carbon or as an anion; and Q is a cationic nitrogen-containing radical from the group consisting of:

(i) an aromatic or heterocyclic amino radical formed from the following compounds: 2-H-pyrrole, pyrrole, imidazole, pyrazole, pyridine, pyrazine, pyrimidine, pyridazine, indolizine, isoindole, 3H-indole, indole, 1H-indazole, purine, 4H-quinolizine, quinoline, isoquinoline, phthalazine, naphthyridine, quinoxaline, quinazoline, 4-H-carbazole, carbazole, β-carboline, phenanthridine, acridine, phenathroline, phenazine, imidazolidine, phenoxazine, cinnoline, pyrrolidine, pyrroline, imidazoline, piperidine, piperzine, indoline, isoindoline, quinuclindine, morpholine, azocine, azepine, 2H-azepine, 1,3,5-triazine, thiazole, pteridine, dihydroquinoline, hexa methylene imine, indazole; and (ii) an amine radical represented by the formula:

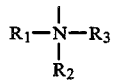

wherein $R_1$, $R_2$ and $R_3$ are from the group consisting of aliphatic hydrocarbon radicals containing from 1 to 30 carbon atoms, aromatic hydrocarbon radicals such as phenyl and any alkyl substituted phenyl radical, and hydrogen radicals, provided that at least one of $R_1$, $R_2$ and $R_3$ is an aliphatic hydrocarbon radical containing from 1 to 30 carbon atoms or an aromatic hydrocarbon, and that when any one of the $R_1$, $R_2$ and $R_3$ radicals contains more than four aliphatic carbon atoms or an aromatic hydrocarbon, the other two radicals are each chosen from the group consisting of hydrogen, methyl, and ethyl radical.

In the above formula, x is preferably an integer of from 4 to 10 or an integer or fractional integer representing an average value of from 4 to 10; w is preferably an integer of from 0 to 12 or is an integer or fractional integer representing an average value of from 0 to 12; y is preferably 0; z is preferably an integer of from 1 to 8 or an integer or fractional integer representing an average value of from 1 to 8; R is preferably chosen from the group consisting of hydrogen and methyl radicals, or mixtures thereof; A is preferably chlorine; and Q is preferably chosen from the group of cationic nitrogen-containing radicals formed by reacting trimethylamine, pyridine, quinoline, isoquinoline, N,N-dimethyl aniline, N-methyl morpholine, or morpholine with a chloro radical functional group.

Most preferably, in the above formula x is an integer of from 6 to 8 or an integer or fractional integer representing an average value of from 6 to 8; w is an integer of from 0 to 8 or an integer or fractional integer representing an average value of from 0 to 8; y is 0; z is an integer of from 1 to 4 or an integer or fractional integer representing an average value of from 1 to 4; R is from the group of hydrogen radicals and methyl radicals and/or mixtures thereof; A is chlorine; and Q is from the group of cationic nitrogen-containing radicals formed by reaction of trimethylamine, pyridine, quinoline, morpholine, and isoquinoline with a pendent chloro radical.

The term "integer or fractional integer representing an average value" indicates that the formula may represent an admixture of compounds wherein the average values of x, w, y and z can be any integer in the range given such as 8 or a fractional integer such as 7.5, 7.8, 8.5 and the like.

A preferred group of nitrogen-containing cationic perfluoronated compounds for use in accordance with the methods of this invention is represented by the following formula:

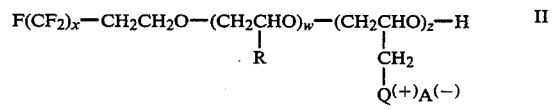   II wherein x is an integer from 2 to 12 or an integer or fractional integer representing an average value of from 2 to 12; w is an integer from 1 to 20 or an integer or fractional integer representing an average value of from 1 to 20; z is an integer from 1 to 20 or a fractional integer representing an average value of from 1 to 20; R is from the group of hydrogen, methyl, ethyl, propyl radicals and mixtures thereof; A is a halogen anion from the group consisting of chlorine, bromine and iodine; and Q is a cationic nitrogen radical from the group consisting of an aromatic amino radical, a heterocyclic amino radical, and an amine radical represented by the formula:

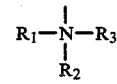

wherein: $R_1$, $R_2$ and $R_3$ are from the group consisting of hydrocarbon radicals containing from 1 to 30 carbon atoms, aromatic hydrocarbon radicals such as phenyl and any alkyl substituted phenyl radical, and hydrogen radicals, provided that at least one of $R_1$, $R_2$ and $R_3$ is an aliphatic hydrocarbon radical containing from 1 to 30 carbon atoms or an aromatic hydrocarbon and that when any one of $R_1$, $R_2$ and $R_3$ radicals contains more than four aliphatic carbon atoms or an aromatic hydrocarbon, the other two radicals are each chosen from the group consisting of hydrogen, methyl and ethyl radicals.

Of this group of compounds, when Q is an aromatic/heterocyclic amino radical, the most preferred compounds are those wherein x is an integer representing an average value of 8; w is an integer or fractional integer representing an average value of from 6 to 10; z is an integer or fractional integer representing an average value of from 1 to 3; R is methyl; and Q is a pyridino or quinolino radical.

When Q is an amine radical, the most preferred compounds are those wherein x is an integer representing an average value of 8; w is an integer or fractional integer representing an average value of from 6 to 8; z is an integer or fractional integer representing an average value of from 1 to 3; R is methyl; $R_1$, $R_2$ and $R_3$ are all methyl and A is chlorine.

Another preferred group of compounds are represented by the formula:

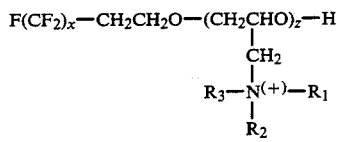

$$F(CF_2)_x\text{—}CH_2CH_2O\text{—}(CH_2CHO)_z\text{—}H \qquad III$$

wherein x is an integer from 2 to 12 or an integer or fractional integer representing an average value of from 2 to 12; z is an integer from 1 to 20 or an integer or fractional integer representing an average value of from 1 to 20; $R_1$, $R_2$ and $R_3$ are each chosen from the group consisting of lower aliphatic hydrocarbon radicals containing from 1 to 4 carbon atoms; and A is a halogen anion chosen from the group consisting of chlorine, bromine and iodine.

Of this group of compounds, the most preferred is where x is an integer representing an average value of 8; z is an integer or fractional integer representing an average value of from 1 to 3; $R_1$, $R_2$ and $R_3$ are all methyl and A is chlorine.

Yet another preferred group of compounds for use in accordance with the methods of the present invention are represented by the formula:

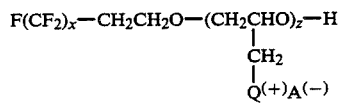

$$F(CF_2)_x\text{—}CH_2CH_2O\text{—}(CH_2CHO)_z\text{—}H \qquad IV$$

wherein x is an integer from 2 to 12 or an integer or fractional integer representing an average value of from 2 to 12; z is an integer from 1 to 20 or an integer or fractional integer representing an average value of from 1 to 20; Q is a nitrogen-containing heterocyclic-/aromatic cationic radical; and A is a halogen anion chosen from chlorine, bromine and iodine anions.

Of this group of compounds, the most preferred is where x is an integer representing an average value of 8; z is an integer representing an average value of from 1 to 3; Q is a pyridino or quinolino radical; and A is chlorine.

The most preferred compounds for use in accordance with the present invention are those represented by Formula II above wherein x is an integer representing an average value of 8; w is an integer or fractional integer representing an average value of from 6 to 8; z is an integer or fractional integer representing an value of 1 to 3; Q is an amine radical wherein $R_1$, $R_2$ and $R_3$ are all methyl; and A is chlorine.

In carrying out the methods of the present invention to improve the productivity of a subterranean formation having impaired permeability, the penetrating solvent is introduced into the formation by pumping down a well bore penetrating the subterranean formation. The penetrating solvent disrupts the water or other aqueous fluid layer coating upon the solid surfaces in the subterranean formation, including the surfaces of any proppant material that may be present, to permit contacting with the cationic perfluoro compound or compounds. The cationic perfluoro compound or compounds can be applied directly to a subterranean formation whereby the surfaces thereof are contacted by the compounds and adsorbed thereon. However, preferably, the cationic perfluoro compound or compounds utilized are dissolved or dispersed in a carrier fluid which is in turn introduced into the formation through the well bore penetrating the same whereby the carried cationic perfluoro compounds are distributed in the formation and contact solid surfaces therein whereby they are adsorbed thereon. Aqueous or hydrocarbon base carrier fluids can be utilized in the form of liquids, foams, emulsions, etc. The particular quantity of perfluoro compounds combined with the carrier fluid can vary widely depending upon the type of formation to be treated and other factors, but generally the cationic perfluoro compounds utilized are combined with the carrier fluid in an amount in the range of from about 0.01% to about 10% by weight of the carrier fluid. Particularly preferred carrier fluids are 50% alcohol foams.

In a preferred embodiment of the invention, the penetrating solvent employed to disrupt the water or aqueous fluid coating and the carrier fluid are the same fluids. In this instance, the penetrating solvent and cationic perfluoro compound or compounds are introduced together such that as the solvent disrupts the water coating the cationic perfluoro compound or compounds contact the water-free solid surfaces and are adsorbed thereon such that the solid surfaces now remain substantially non-wettable by water or hydrocarbons. When a proppant material has been placed in fractures formed in the subterranean formation by prior stimulation treatments, the penetrating solvent also disrupts the water coating on this material and the cationic perfluoro compound or compounds are adsorbed thereon. Thus, both the surfaces of the formation and the surfaces of the proppant material have cationic perfluoro compounds adsorbed thereon whereby such surfaces are substantially prevented from being wetted by water or hydrocarbons and the flow of hydrocarbons through the formation and proppant material is significantly increased.

In order to facilitate a clear understanding of the methods of the present invention, and not by way of limitation, the following examples are provided.

EXAMPLE I

Various cationic perfluoro compounds of structural Formula II above are tested to determine their effectiveness in producing a non-wetting surface.

Test Procedure

40–60 Ottawa (from Minnesota) sand is sieved three times through a 50 mesh screen. The sieved sand (93 g) is placed in 300 ml. of methanol containing 0.01% by weight of the cationic perfluoro compounds to be tested. The slurry is stirred vigorously to insure complete solution sand contact, and the methanol is evaporated. The treated sand is cooled to room temperature and then placed in a horizontally positioned 1½" I.D.×12" cylindrical polypropylene tubing. The ends of the packed column are stoppered with a 1½" diameter 60 mesh screen and a number 0 stopper with a 9 mm.

hole. The column fluid entry point is equipped with a piece of 'Y' shaped 9 mm. tubing with a stopcock on each arm of the 'Y'; one arm leads to the column; the other two arms lead to 500 ml. water and oil reservoirs, which are placed 18" above the horizontal column to provide a constant head. The fluid exit point of the column is equipped with a 3", 120° elbow fashioned from 9 mm. glass tubing. A 1" piece of 5 mm. glass rod is annealed to the bend point of the elbow to direct flowing fluid into a collecting vessel. The elbow is pointed upward in order to maintain a constant, maximum fluid volume (no air entrapment).

Distilled water is flowed through the column for 10 minutes (5 column volumes), followed immediately by Phillips Soltrol 160 (a refined aliphatic oil). The time for the oil to displace the water is noted, and the flow rate of the oil is measured (from the time of the first collected drop) for 10 minutes. Each test is run in duplicate or triplicate.

The results of these tests are shown in Table I below.

TABLE I

EFFECTIVENESS OF CATIONIC PERFLUORO COMPOUNDS IN PRODUCING NON-WETTING SAND SURFACES

| Cationic Perfluoro Compounds Tested (Structural Formula II above) | | | | | | Average[1] Flow Rate of Soltrol 160 Following |
|---|---|---|---|---|---|---|
| x | w | R | z | A | Q | Water (ml./min.) |
| 8 | 0 | — | 1.5 | Cl | pyridine | 4.0 |
| 8 | 0 | — | 3.0 | Cl | pyridine | 3.5 |
| 8 | 0 | — | 3.0 | Cl | quinoline | 3.2 |
| 8 | 0 | — | 1.5 | Cl | trimethylamine | 3.8 |
| 8 | 0 | — | 2.0 | Cl | trimethylamine | 3.6 |
| 8 | 0 | — | 3.0 | Cl | trimethylamine | 3.5 |
| 8 | 2 | —$CH_3$ | 1.5 | Cl | trimethylamine | 3.8 |
| 8 | 2 | —$CH_3$ | 2.0 | Cl | trimethylamine | 3.6 |
| 8 | 4 | —$CH_3$ | 1.5 | Cl | trimethylamine | 4.0 |
| 8 | 6 | —$CH_3$ | 1.5 | Cl | trimethylamine | 4.3 |
| 8 | 8 | —$CH_3$ | 1.5 | Cl | trimethylamine | 4.5 |
| 8 | 12 | —$CH_3$ | 1.5 | Cl | trimethylamine | 3.8 |
| 8 | 6 | H | 1.5 | Cl | pyridine | 2.3 |
| 8 | 6 | H | 1.5 | Cl | pyridine | 1.7 |

[1]Variation between flow rates of duplicate runs averaged 5%

In runs of oil following water on untreated sand, no flow of oil is detected for 15 minutes and only 2 ml. of oil are collected within one hour. In runs in which the sand is treated with cationic perfluoro compounds (Table I above), the time required to displace the water in the sand pack is less than four minutes, and subsequent oil flow rates are in the range of 2 to 5 ml./min., depending on the particular structure of the cationic perfluoro compound. The greater the sustained flow rate of oil following water, the more pronounced is the non-wetting effect of the sample.

EXAMPLE II

The procedure of Example I is repeated using cationic perfluoro compounds and several conventional hydrocarbon surfactants. The results of these tests are given in Table II below:

TABLE II

COMPARISON OF NON-WETTING BROUGHT ABOUT BY VARIOUS SURFACTANTS

| Quantity of Surfactant | Surfactant Used | Relative % Flow Rate of Oil Achieved |
|---|---|---|
| 0.01% by Weight | Cationic perfluoro compounds (Structural Formula II, x = 8, w = 8, R = $CH_3$, z = 1.5, A = Cl, Q = trimethylamine) | 100.00% |
| 0.5% by Volume | $NH_4$ Salt of Sulfated ethoxylated $C_{12-14}$ Alcohol[1] | 0.74% |
| 0.5% by Volume | $C_{12-16}$ trialkyl ammonium chloride formulation[1] | 4.2% |
| 0.5% by Volume | $NH_4$ Salt of $C_{12}$ diphenylether sulfonate formulation[1] | 42.00% |

[1]Added to water phase

From Table II it can be seen that the cationic perfluoro compounds are much more effective in preventing the wetting of solid surfaces than conventional hydrocarbon surfactants.

EXAMPLE III

A cationic perfluoro compound of Structural Formula II above is tested with a penetrating solvent to determine their effectiveness in treating a water block.

Test Procedure

40–60 Ottawa sand is sieved through a 50 mesh screen and placed in a horizontally positioned column comprising 1½" I.D. × 12" cylindrical polypropylene tubing. The ends of the packed column are stoppered with a 1½" diameter 60 mesh screen and a number 0 stopper with a 9 mm. hole. The column fluid entry point is equipped with a piece of 'Y'-shaped 9 mm. tubing with a stopcock on each arm of the 'Y', one arm leads to the column; the other two arms lead to 500 ml. water and oil reservoirs, which are placed 18" above the horizontal column to provide a constant head. The fluid exit point of the column is equipped with a 3" 120° elbow fashioned from 9 mm. glass tubing. A 1" piece of 5 mm. glass rod is annealed to the bend point of the elbow to direct flowing fluid into a collecting vessel. The elbow is pointed upward in order to maintain a constant, maximum fluid volume (no air entrapment).

The column is filled with distilled water and followed with one column volume of a test solution. This is followed immediately with Isopar L (a refined aliphatic oil). The time for the oil to displace the test solution is noted and the flow rate of the oil is measured (from the time of the first collected drop) for ten minutes.

The results of the tests are shown in Table III below.

TABLE III

| Test Solution | Break-through | Time, (Min.) | Cumulative Oil Flow, (ml.) |
|---|---|---|---|
| 1. 500 gal./1000 gal. MeOH, 5 gal./1000 gal. concentrated 28% HCl, 2 gal./1000 gal. $C_{10}$-$C_{12}$ alcohol alkoxylate formulation and 2% KCl solution to provide 1000 gals. | 4 min. | 1 | 1.5 |
|  |  | 2 | 3.5 |
|  |  | 3 | 5.0 |
|  |  | 4 | 8.0 |
|  |  | 5 | 10.5 |
|  |  | 6 | 13.5 |
|  |  | 7 | 16.0 |
|  |  | 8 | 18.5 |
|  |  | 9 | 21.0 |
|  |  | 10 | 23.5 |
|  |  | Average oil flow rate | 2.35 ml./min. |
| 2. Same as above plus 0.01% by weight cationic perfluoro compounds (Structural | 2.5 min. | 1 | 4.0 |
|  |  | 2 | 8.5 |
|  |  | 3 | 13.0 |

TABLE III-continued

| Test Solution | Break-through | Time, (Min.) | Cumulative Oil Flow, (ml.) |
|---|---|---|---|
| Formula II, x = 8, w = 8, | | 4 | 18.5 |
| R = CH$_3$, z = 1.5, A = Cl, | | 5 | 22.0 |
| Q = trimethylamine | | 6 | 26.0 |
| | | 7 | 31.0 |
| | | 8 | 35.0 |
| | | 9 | 40.0 |
| | | 10 | 44.0 |
| | Average oil flow rate | | 4.4 ml./min. |

From Table III it can be seen that the method of the present invention is effective in treating water blocked formations.

EXAMPLE IV

To further illustrate the effectiveness of the present invention in treating water blocked sandstone formations, the following test is performed.

A well in Moffat County, Colorado, is producing 100 MCF of gas per day from the Fort Union Sand Formation. The formation has a permeability of 0.1 millidarcy.

The well is treated in accordance with the methods of the present invention employing a fluid comprising 50 volume percent methanol, 2 gal./1000 gal. C$_{10}$-C$_{12}$ alkoxylate formulation (foaming agent), 0.01 weight percent cationic perfluoro compounds (Structural Formula II, x=8, w=8, R=CH$_3$, z=1.5, A=Cl, Q=trimethylamine), 40 volume percent liquid nitrogen to provide a gas assist in fluid recovery and 2% KCl solution.

The well, after treatment, is producing 300 MCF of gas per day.

While that which is considered to be the preferred embodiment of the present invention has been described herein, it is to be understood that modifications, changes or the like can be made in the methods and compositions disclosed without departing from the spirit or scope of the invention as defined in the appended claims.

What is claimed is:

1. A method of increasing the production of hydrocarbons from a hydrocarbon-containing subterranean formation having impaired permeability as a result of formation invasion by aqueous fluids comprising contacting said formation with a penetrating solvent capable of disrupting a least a portion of any aqueous layer present on solid surfaces within said formation and a cationic perfluoro compound whereby said compound is adsorbed onto said solid surfaces of said formation said cationic perfluoro compound being selected from the group consisting of a compound or mixtures of compounds represented by the formula:

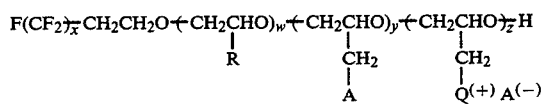

wherein x is an integer from 2 to 12 or an integer or fractional integer representing an average value of from 2 to 12; w and y are both individually integers from 0 to 20 or integers or fractional integers representing average values of from 0 to 20; z is an integer from 0 to 20 or an integer or fractional integer representing an average value of from 0 to 20, the sum of y and z being from 1 to 20; R is a hydrogen, methyl, ethyl or propyl radical, or mixtures thereof; A is a halogen chosen from chlorine, bromine or iodine; and Q is a cationic nitrogen radical from the group consisting of an aromatic amino radical, a heterocyclic amino radical, and an amine radical represented by the formula:

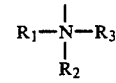

wherein R$_1$, R$_2$ and R$_3$ are from the group consisting of hydrocarbon radicals containing from 1 to 30 carbon atoms, aromatic hydrocarbon radicals such as phenyl and any alkyl substituted phenyl radical, and hydrogen radicals, provided that at least one of R$_1$, R$_2$ and R$_3$ is an aliphatic hydrocarbon radical containing from 1 to 30 carbon atoms or an aromatic hydrocarbon and that when any one of R$_1$, R$_2$ and R$_3$ radicals contains more than four aliphatic carbon atoms or an aromatic hydrocarbon, the other two radicals are each chosen from the group consisting of hydrogen, methyl and ethyl radicals.

2. The method of claim 1 wherein said contacting of said formation with said cationic perfluoro compound or compounds is brought about by dissolving or dispersing said compound or compounds in a carrier fluid and introducing said carrier fluid into said formation.

3. The method of claim 2 wherein said cationic perfluoro compound is present in said carrier fluid in an amount in the range of from about 0.01% to about 10% by weight of said carrier fluid.

4. The method of claim 1 wherein said cationic perfluoro compound is selected from the group consisting of a compound or mixture of compounds represented by the formula:

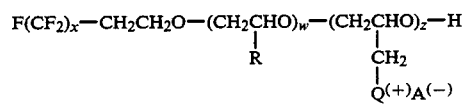

wherein x is an integer from 2 to 12 or an integer or fractional integer of from 2 to 12; w is an integer from 1 to 20 or an integer or fractional integer of from 1 to 20; z is an integer from 1 to 20 or an integer or fractional of from 1 to 20, R is selected from the group of hydrogen, methyl, ethyl, propyl radicals and mixtures thereof; A is a halogen anion from the group consisting of chlorine, bromine and iodine; and Q is a cationic nitrogen radical from the group consisting of an aromatic amino radical, a heterocyclic amino radical, and an amine radical represented by the formula:

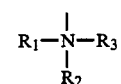

wherein R$_1$, R$_2$ and R$_3$ are from the group consisting of hydrocarbon radicals containing from 1 to 30 carbon atoms, aromatic hydrocarbon radicals such as phenyl and any alkyl substituted phenyl radical, and hydrogen radicals, provided that at least one of $R_1$, $R_2$ and $R_3$ is an aliphatic radical containing from 1 to 30 carbon atoms or an aromatic hydrocarbon and that when any one of $R_1$, $R_2$ and $R_3$ radicals contains more than four aliphatic carbon atoms or an aromatic hydrocarbon, the other two radicals are each chosen from the group consisting of hydrogen, methyl and ethyl radicals.

5. The method of claim 4 wherein x is 8; w is from 6 to 10; z is from 1 to 3; R is a methyl radical; A is chlorine; and Q is a cationic nitrogen radical selected from the group consisting of pyridino and quinolino.

6. The method of claim 4 wherein x is 8; w is from 6 to 8; z is from to 3; A is chlorine; and Q is a trimethylamino radical.

7. The method of claim 1 wherein said cationic perfluoro compound is selected from the group consisting of a compound or mixture of compounds represented by the formula:

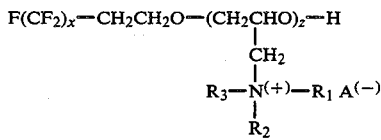

wherein x is an integer from 2 to 12 or an integer or fractional integer representing an average value of from 2 to 12; z is an integer of from 1 to 20 or an integer or fractional integer representing an average value of from 1 to 20, $R_1$, $R_2$ or $R_3$ are each chosen from the group consisting of lower aliphatic hydrocarbon radicals containing from 1 to 4 carbon atoms; and A is a halogen anion chosen from the group consisting of chlorine, bromine or iodine.

8. The method of claim 7 wherein x is 8; z is from 1 to 3; $R_1$, $R_2$ and $R_3$ are each methyl radicals; and A is a chlorine anion.

9. The method of claim 1 wherein said cationic perfluoro compound or compounds are represented by the formula:

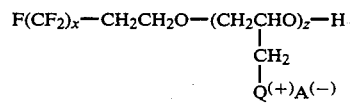

wherein x is an integer from 2 to 12 or an integer or fractional integer representing an average value of from 2 to 12; z is an integer of from 1 to 20 or an integer or fractional integer representing an average value of from 1 to 20, Q is a nitrogen-containing heterocyclic or aromatic cationic radical; and A is a halogen anion chosen from the group of chlorine, bromine or iodine anions.

10. The method of claim 9 wherein x is 8; z is from 1 to 3; Q is a cationic nitrogen radical selected from the group consisting of pyridino and quinolino radicals; and A is a chlorine anion.

11. The method of claim 4 wherein x is 8; w is from 6 to 8; z is from 1 to 3; Q is a trimethylamino radical; and A is the chlorine anion.

12. The method of claim 1 wherein x is from 4 to 10; w is from 0 to 12; y is 0; z is from 1 to 8; R is from the group of hydrogen and methyl radicals, and mixtures thereof; A is chlorine; and Q is selected from the group of trimethylamino, pyridino, quinolino, isoquinolino, N,N dimethyl anilino, N-methyl morpholino and morpholino radicals.

13. A method of increasing the production of hydrocarbons from a hydrocarbon-containing subterranean formation having impaired permeability as a result of formation invasion by aqueous fluids comprising contacting said formation with a penetrating solvent capable of disrupting at least a portion of any aqueous layer present on said solid surfaces within said formation and a cationic perfluoro compound whereby said compound is adsorbed onto said solid surfaces of said formation, said cationic perfluoro compound having the formula:

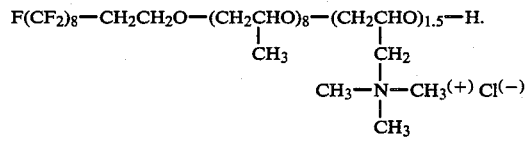

UNITED STATES PATENT AND TRADEMARK OFFICE
CERTIFICATE OF CORRECTION

PATENT NO. : 4,565,639
DATED : 01/21/86
INVENTOR(S) : Penny et al

It is certified that error appears in the above-identified patent and that said Letters Patent is hereby corrected as shown below:

Column 11, Claim 6, line 16 delete the phrase [z is from to 3] and insert therefor -- z is from 1 to 3--.

Signed and Sealed this

Fifteenth Day of April 1986

[SEAL]

Attest:

Attesting Officer

DONALD J. QUIGG

Commissioner of Patents and Trademarks